United States Patent Office 3,122,839
Patented Mar. 3, 1964

3,122,839
AUTOMATIC RADIAL RUNOUT TESTER FOR GEARWHEELS
Karl Müller, Zurich, Switzerland, assignor to Maag Gear Wheel & Machine Company Limited, Zurich, Switzerland, a company of Switzerland
Filed Nov. 1, 1961, Ser. No. 149,414
Claims priority, application Germany Nov. 7, 1960
8 Claims. (Cl. 33—179.5)

This invention relates to radial runout testers for gearwheels, wherein a detector or feeler is automatically introduced into the tooth gaps, its position when at the maximum depth of introduction is indicated or recorded, the gearwheel to be tested is advanced through certain angle values between the individual detector movements, and the measuring position and disengaged position are imparted to the detector by means of a drive.

The fluctuations of the measured values indicate the radial runout error, since the automatic testing is carried out over the entire periphery.

In a known tester of this kind the detector or feeler is given an additional lateral movement by means of a transmission when the said detector is moved into and out of the measuring position, this additional lateral movement being such that each time it advances the gearwheel by an amount equivalent to half the pitch. The detector is mounted on a movable plate, which is so guided by means of two eccentrics, one of which (the measuring eccentric) is mounted in a bore in the plate while the other (the control eccentric) is mounted positively in a slide guide in the plate, that the detector performs the required movement.

A tester, according to this invention is characterised in that the drive for the detector comprises a disc inclined with respect to the workpiece axis, for the performance of an elliptical movement component, and this component is used to obtain the measuring position and disengaged position of the detector.

The disc may be provided with a driver, the radial distance of which from the axis of the dis is adjustable, to influence the magnitude of the elliptical movement of the detector. Operation and change-over to different kinds of gearwheels is greatly simplified in this manner.

One embodiment of the invention is shown diagrammatically in the accompanying drawings, wherein.

Figure 1:
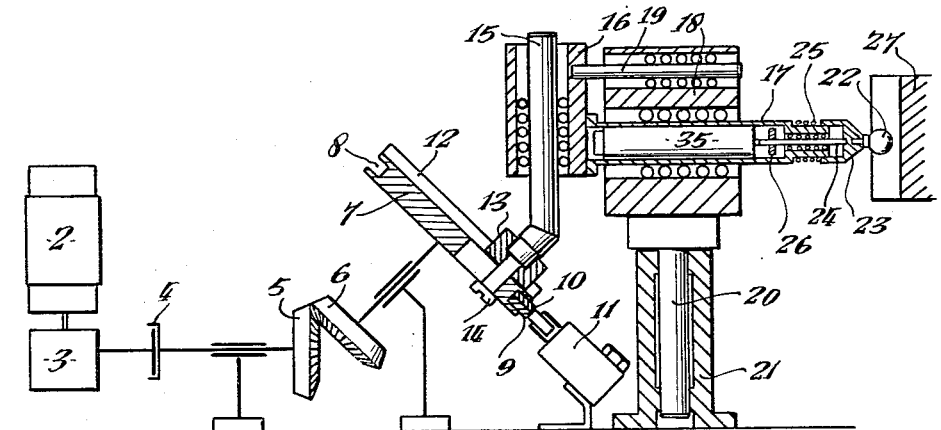
FIG. 1 is a longitudinal elevation of the tester, partly in section, in the measuring position.
Figure 2:
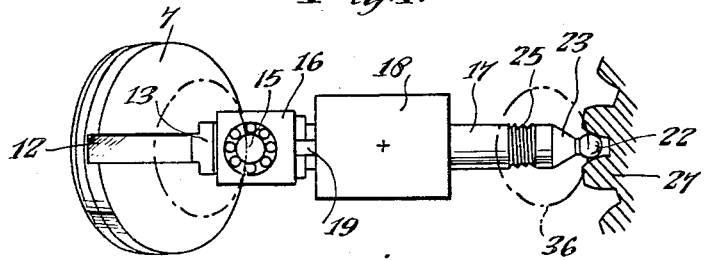
FIGS. 2 and 3 are plan views of a part of the tester, in different positions.

The tester is mounted on a baseplate 1. A motor 2, which is supported on the baseplate 1 in a fixed position, drives a bevel gear 5 by way of a transmission 3 and an electromagnetic clutch 4. The bevel gear 5 meshes with another bevel gear 6 which drives an inclined disc 7. An annular groove 8 is provided in the periphery of the disc 7, and in the groove 8 are fastened adjustable cams 9 and 10 which act on a control switch 11 which influences the electromagnetic clutch 4. A groove 12 is also provided in the disc 7, diametrically thereof, a driver 13 being clamped in the groove 12 by means of a screw 14. The driver 13 is adjustable along the groove 12 in respect of its distance from the axis of the disc 7, in order to influence the magnitude of the elliptical movement of the detector. A rod 15, which is bent at an angle and which is mounted to be rotatable and axially movable in a pivoting element 16, engages in a recess in the driver 13. The axial movability of the rod 15 is substantially parallel to the axis of a gearwheel 27 which is to be tested. A tube 17 is rigidly fastened on the pivoting element 16, and the axis of the tube 17 is substantially perpendicular to the axis of the angled rod 15, and is in a plane which is perpendicular to the axis of the gearwheel 27. The tube 17 is mounted to be axially slidable in a pivoting element 18. An auxiliary rod 19 is provided in the pivoting element 16 and is disposed to be axially slidable in the pivoting element 18 in order to prevent any rotary movement of the element 16 about the axis of the tube 17 and thus ensure that the pivoting element 16 and the tube 17 have only a movement in the pivoting element 18 which is axial of the tube 17. The pivoting element 18 is secured, adjustably, on a pin 20 which is mounted rotatably in a bearing support 21 which also is secured, adjustably, on the baseplate 1. A spherical detector or feeler 22, which is mounted in a head 23 on a guide pin 24, is mounted to be axially slidable in the tube 17. A compression spring 25 is disposed between the tube 17 and the head 23, and thus continually urges the head 23 and the detector 22 away from the tube 17. The movement of the guide pin 24, head 23 and detector 22 away from the tube 17 is limited by a collar 26 secured on the guide pin 24 which (when the detector 22 is disengaged from the gearwheel 27) will abut a shoulder in the bore of the tube 17; in the position shown in FIGS. 1 and 2 the collar 26 does not abut the shoulder in the tube 17, and in this position the guide pin 24 presses against an electronic detector 35 which is provided in the tube 17. From the detector 35 wires run to an amplifier (not shown), which conducts pulses to a recorder or other device known per se. The gearwheel 27 which is to be tested is mounted on a separate axle independently of the tester; this axle is assumed to be vertical in the drawings, but it is possible for the gearwheel axle to extend horizontally or in any other position and for the tester to the arranged accordingly.

Figure 4:
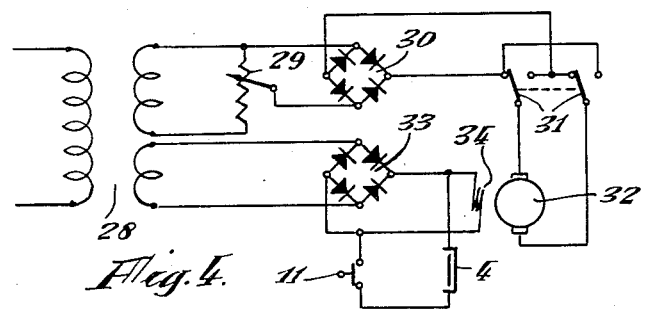
FIG. 4 shows the electrical circuit.

The diagram in FIG. 4 shows diagrammatically the electrical equipment of the tester. A transformer 28 is connected to a mains supply and feeds a first component voltage of a maximum of 110 v. through a variable resistance 29, a rectifier 30 and a rotation-direction-change switch 31 to the rotor 32 of the motor 2. The variable resistance 29 can be adjusted from zero to maximum for motor speed control purposes. The transformer 28 delivers a second component voltage of 12 volts through a rectifier 33 to the control switch 11 and the electromagnetic clutch 4, on the one hand, and to the stator winding 34 of the motor 2 on the other hand.

Figure 3:
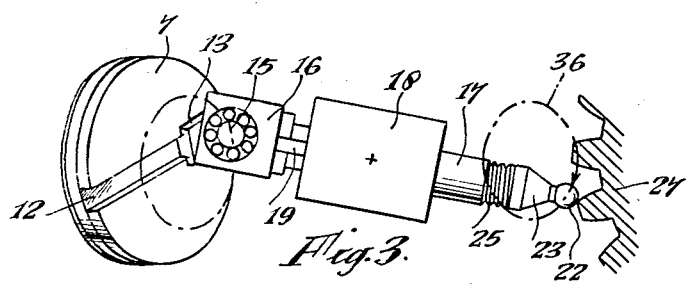

Radial runout testing is effected by introducing a measuring element, for example the detector 22 constructed as a ball, into the gaps between the teeth of the gearwheel 27. The position of maximum introduction into each tooth gap is a comparative measurement and is indicated by way of an amplifier and recorder of known type. During certain angle values through which the gearwheel 27 rotates, the detector 22 is also automatically moved, over an elliptical path 36, from a position (not shown) commencing engagement with the gearwheel into the measuring position (FIG. 2) and then into the position (FIG. 3) where it is about to be disengaged from the gearwheel.

The elliptical path 36 of the detector 22 is produced by the rotating disc 7, the horizontal component of the movement of the disc reaching the detector 22 by way of the tube 17, while the vertical component is absorbed in the axial movement of the rod 15. Testing may be carried out in each tooth gap or at certain intervals. The magnitude of the elliptical movement 36 of the detector 22 is determined primarily by the adjustable distance of the driver 13 from the disc axis. A further influencing of the form and magnitude of the elliptical path 36 of the detector 22 is possible by adjustment of the pivoting element 18 on the pin 20, and of the bearing support 21 on the baseplate 1. The movement of the detector 22 takes place substantially in a plane perpendicular to the axis of the gearwheel 27.

The mode of operation shown in FIGS. 1 to 4 is based mainly on radial runout testing of relatively large gearwheels, in which case the gearwheel 27 which is to be tested in driven by a driving source outside the tester. This may be a separate motor, or the gearwheel 27 may be driven from the gearwheel machining machine on or beside which the tester is disposed.

With this mode of operation, the drive from the motor 2 is transmitted through the transmission 3 to drive one half of the electromagnetic clutch 4, but the clutch itself is out of operation periodically under the action of the control switch 11 and the engagement therewith of the two cams 9 and 10 the position of which on the disc 7 can be adjusted. The drive of the detector 22 by the motor 2 in the zone of the engaged position thus is stopped. In this zone the movement of the detector 22 over the elliptical path 36 is effected by the gearwheel 27. The time during which the electromagnetic clutch 4 is disengaged depends on the modulus and number of teeth of the gearwheel 27.

With another mode of operation (not shown in the drawings), more particularly for smaller gearwheels to be tested, the drive of the gearwheel is effected intermittenly through the detector 22 from the tester motor 2. The gearwheel 27 is mounted freely so that the detector 22 can drive it easily in the zone of the engaged position. In this case it is also possible to use the cams 9 and 10 to reduce the speed of the motor 2, in the zone of engagement of the detector 22, by means of the control switch 11.

When the gearwheel 27 which is to be tested is driven from the tester, it is possible for the drive for the disc 7 to be continuous. In this case, the cams 9 and 10 are removed and the control switch 11 is inoperative.

In both cases it may be advantageous for the detector movement in the zone of the engaged position of the detector 22 to be controlled by the cams 9 and 10 on the disc 7 and by means of the control switch 11. This may involve disengagement of the electromagnetic clutch 4 or the reduction of speed of the motor 2.

It any case it is advantageous for the speeds of the motor 2 to be adapted to selection by infinitely variable control, in order thus to adjust it to the optimum testing speed for the gearwheel undergoing test.

What I claim and desire to secure by Letters Patent is:

1. A gearwheel runout tester comprising a single detector, drive means coupled to said detector for successively introducing said detector into the gaps between adjacent teeth of a gearwheel to be tested a distance less than the depth of the gaps and for withdrawing the detector from the gaps, means for indicating the position of said detector when engaging the two tooth flanks bounding said gaps at the maximum penetration of the detector into each gap; said drive means including a rotary disc having its axis disposed at an angle to the gearwheel axis, a driving element mounted eccentrically on the rotary disc and movable therewith in a path which is thus elliptical when viewed along an imaginary line passing through the center of the path and parallel to the gear wheel axis and means transmitting a component of said elliptical path to the detector to move it in a similar elliptical path to engage the two flanks bounding a gap and thereby determine the indicating position of the detector.

2. A tester according to claim 1, wherein the drive for the gearwheel which is to be tested is effected from a drive source independent of the tester.

3. A tester according to claim 1, wherein the drive for the gearwheel to be tested is effected intermittently by means of the detector.

4. A tester according to claim, wherein the nature of the detector movement in the zone of the engaged position is controlled by cams on the disc.

5. A tester according to claim 1, wherein the eccentricity of the driving element from the axis of the disc is adjustable, to influence the magnitude of the elliptical movement of the detector.

6. A tester according to claim 5, wherein the driving element drives a rod which is bent at an angle and which is slidable substantially parallel to the axis of the gearwheel which is to be tested, said rod both pivoting and moving axially in a first pivoting element and reciprocating said first pivoting element in a second pivoting element in a plane substantially perpendicular to the axis of the said gearwheel, the first pivoting element carrying the detector and hence imparting the elliptical movement component to the detector.

7. A tester according to claim 6, wherein the second pivoting element pivots about the axis of a pin which is substantially parallel to the axis of the said gearwheel.

8. A tester according to claim 7, wherein the second pivoting element is adjustable with respect to the said pin, and a support carrying the said pin is adjustable with respect to a baseplate, to enable the form and magnitude of the elliptical movement component to be influenced.

References Cited in the file of this patent

UNITED STATES PATENTS

| | | |
|---|---|---|
| 2,775,041 | Pomernacki | Dec. 25, 1956 |
| 3,069,779 | Bauer et al. | Dec. 25, 1962 |

UNITED STATES PATENT OFFICE
CERTIFICATE OF CORRECTION

Patent No. 3,122,839                          March 3, 1964

Karl Muller

It is hereby certified that error appears in the above numbered patent requiring correction and that the said Letters Patent should read as corrected below.

Column 1, line 41, for "dis" read -- disc --; column 3, line 7, for "in" read -- is --; line 26, for "intermittenly" read -- intermittently --; column 4, line 20, after "gearwheel" insert -- which is --; line 22, after "claim" insert -- 1 --.

Signed and sealed this 7th day of July 1964.

(SEAL)
Attest:

ERNEST W. SWIDER                                    EDWARD J. BRENNER
Attesting Officer                                       Commissioner of Patents